United States Patent
Matsuyama et al.

(10) Patent No.: US 9,090,728 B2
(45) Date of Patent: Jul. 28, 2015

(54) BINDER FOR SECONDARY BATTERY ELECTRODES

(75) Inventors: Takashi Matsuyama, Osaka (JP); Kimio Misaki, Niihama (JP)

(73) Assignee: NIPPON A & L INC., Osaka (JP)

( * ) Notice: Subject to any disclaimer, the term of this patent is extended or adjusted under 35 U.S.C. 154(b) by 217 days.

(21) Appl. No.: 13/517,365

(22) PCT Filed: Dec. 25, 2009

(86) PCT No.: PCT/JP2009/007303
§ 371 (c)(1),
(2), (4) Date: Jun. 20, 2012

(87) PCT Pub. No.: WO2011/077500
PCT Pub. Date: Jun. 30, 2011

(65) Prior Publication Data
US 2012/0264878 A1    Oct. 18, 2012

(51) Int. Cl.
| | | |
|---|---|---|
| *C08F 265/00* | (2006.01) | |
| *C08F 285/00* | (2006.01) | |
| *H01M 4/62* | (2006.01) | |
| *C08F 257/02* | (2006.01) | |
| *C08F 220/06* | (2006.01) | |
| *C08F 236/04* | (2006.01) | |
| *C08F 220/10* | (2006.01) | |
| *C08F 12/02* | (2006.01) | |
| *C08F 212/02* | (2006.01) | |
| *H01M 4/13* | (2010.01) | |

(52) U.S. Cl.
CPC ............ *C08F 265/00* (2013.01); *C08F 257/02* (2013.01); *C08F 285/00* (2013.01); *H01M 4/622* (2013.01); *C08F 12/02* (2013.01); *C08F 212/02* (2013.01); *C08F 220/06* (2013.01); *C08F 220/10* (2013.01); *C08F 236/04* (2013.01); *H01M 4/13* (2013.01)

(58) Field of Classification Search
CPC .......... C08F 12/02; C08F 12/08; C08F 20/10; C08F 20/06; C08F 20/44; C08F 212/02; C08F 212/08; C08F 220/02; C08F 220/06; C08F 220/10; C08F 236/02; C08F 236/04; C08F 236/06; C08F 36/02; C08F 36/04; C08F 36/06; C08F 36/045; C08F 265/00; C08F 285/00; C08F 220/44
See application file for complete search history.

(56) References Cited

U.S. PATENT DOCUMENTS

| | | | | |
|---|---|---|---|---|
| 2002/0068783 | A1* | 6/2002 | Maeda et al. ................ | 524/474 |
| 2003/0113626 | A1 | 6/2003 | Maeda et al. | |
| 2004/0062989 | A1* | 4/2004 | Ueno et al. .................... | 429/217 |

FOREIGN PATENT DOCUMENTS

| | | |
|---|---|---|
| JP | 5-74461 A | 3/1993 |
| JP | 8-250122 A | 9/1996 |
| JP | 8-250123 A | 9/1996 |
| JP | 09-087571 A | 3/1997 |
| JP | 11-25989 A | 1/1999 |
| JP | 11-149929 A | 6/1999 |
| JP | 2000-299109 A | 10/2000 |
| WO | WO 98/39808 A1 | 9/1998 |

OTHER PUBLICATIONS

Notification of Transmittal of Translation of the International Preliminary Report on Patentability (Forms PCT/IB/338 and PCT/IB/373) and the Written Opinion of the International Searching Authority (Form PCT/ISA/237) issued on Aug. 23, 2012, in the corresponding International Application No. PCT/JP2009/007303. (6 pages).

Notification Concerning Transmittal of International Preliminary Report on Patentability (Forms PCT/IB/326 and PCT/IB/373) and the Written Opinion of the International Searching Authority (Form PCT/ISA/237) issued on Jul. 5, 2012, in the corresponding International Application No. PCT/JP2009/007303. (5 pages).

International Search Report (PCT/ISA/210) issued on Mar. 23, 2010, by the Japanese Patent Office as the International Searching Authority for International Application No. PCT/JP2009/007303.

Office Action issued in corresponding Japanese Patent Application No. 2010-535096, dated Sep. 11, 2012, pp. 1-3, in its English translation.

\* cited by examiner

*Primary Examiner* — Karuna P Reddy
(74) *Attorney, Agent, or Firm* — Buchanan, Ingersoll & Rooney PC

(57) ABSTRACT

A binder for secondary battery electrodes contains a copolymer latex obtained by emulsion polymerization of a monomer composition containing 12.0 to 39.5 wt % of an aliphatic conjugated diene-based monomer, 1.5 to 8.5 wt % of an unsaturated carboxylic acid alkyl ester monomer, 0.1 to 10.0 wt % of an ethylene-based unsaturated carboxylic acid monomer, and 42.0 to 86.4 wt % of a monomer that is copolymerizable therewith, wherein 50 to 100 wt % of the copolymer latex is toluene-insoluble.

1 Claim, No Drawings

BINDER FOR SECONDARY BATTERY ELECTRODES

TECHNICAL FIELD

The present invention relates to a binder for secondary battery electrodes.

BACKGROUND ART

Lithium ion secondary batteries are lightweight and have a high energy density, and therefore use of lithium ion secondary batteries as a power source for small electronic devices, automobiles, or houses has been examined. Upon production of lithium ion secondary battery electrodes, usually, a polymer binder is used as the binder, and an active material (positive electrode active material and negative electrode component material) is blended with the polymer binder to prepare an electrode composition, and the electrode composition is applied on the current collector and dried, thereby binding the active material to the current collector. The polymer binder is required to be adhesive to the active material, adhesive to the current collector, resistant to a polar solvent which is the liquid electrolyte, and stable under an electrochemical environment.

Conventionally, a fluorine-based polymer such as polyfluorovinylidene has been used as such a polymer binder. However, the fluorine-based polymer has to be dissolved in an organic solvent, and there is a disadvantage in that when the electrode composition is applied to the current collector and then dried, the organic solvent is volatilized. Also, there is a disadvantage in that because of its poor binding capacity, the polymer binder has to be blended in a large amount to obtain sufficient binding capacity, which inhibits conductivity of the secondary battery.

Thus, to make an improvement in the above-described disadvantages, various proposals have been made to use an aqueous dispersion of a non fluorine-based polymer as the polymer binder.

For example, Japanese Unexamined Patent Publication No. H5-74461 (Patent Document 1) has proposed using a styrene-butadiene latex having specific composition and gel content as the polymer binder to obtain a secondary battery with excellent cycle characteristics, storage characteristics, and safety.

Furthermore, Japanese Unexamined Patent Publication No. H11-25989 (Patent Document 2) has proposed using a water-based dispersion of a copolymer having specific composition and glass transition temperature as the polymer binder to obtain a secondary battery with high capacity, excellent discharge performance, charge and discharge cycle characteristics, and safety.

Furthermore, Japanese Unexamined Patent Publication No. H8-250122 (Patent Document 3) has proposed using a styrene-butadiene latex having a butadiene content of a specific range as the binder, and drying the binder at 50° C. or more to obtain a battery electrode with excellent cycle characteristics, storage characteristics, and safety.

CITATION LIST

Patent Document

Patent Document 1 Japanese Unexamined Patent Publication No. H5-74461
Patent Document 2 Japanese Unexamined Patent Publication No. H11-25989
Patent Document 3 Japanese Unexamined Patent Publication No. H8-250122

SUMMARY OF THE INVENTION

Problem to be Solved by the Invention

However, the polymer binders described in the above-described Patent Documents 1 and 2 are prepared as an aqueous dispersion of an electrode composition: on the one hand, the disadvantage of volatilization of the organic solvent when producing the electrode can be reduced; but on the other hand, those polymer binders have insufficient binding capacity to the current collector and to the active material, and the electrode-coating layer has insufficient resistance to bending and cracks, and insufficient flexibility.

Thus, an object of the present invention is to provide a binder for secondary battery electrodes, with which an electrode-coating layer having a low tackiness, excellent resistance to bending and cracks, and excellent flexibility can be formed, and which has excellent binding capacity to the current collector and to the active material.

Means for Solving the Problem

To solve the above-described problem, a binder for secondary battery electrodes of the present invention includes a copolymer latex obtained by emulsion polymerization of a monomer composition including 12.0 to 39.5 wt % of an aliphatic conjugated diene-based monomer, 1.5 to 8.5 wt % of an unsaturated carboxylic acid alkyl ester monomer, 0.1 to 10.0 wt % of an ethylene-based unsaturated carboxylic acid monomer, and 42.0 to 86.4 wt % of a monomer that is copolymerizable therewith, wherein 50 to 100 wt % of the copolymer latex is toluene-insoluble.

Effects of the Invention

The binder for secondary battery electrodes according to the present invention includes a copolymer latex obtained by emulsion polymerization of a monomer composition containing an aliphatic conjugated diene-based monomer, an unsaturated carboxylic acid alkyl ester monomer, an ethylene-based unsaturated carboxylic acid monomer, and a monomer that is copolymerizable therewith at a predetermined ratio, wherein 50 to 100 wt % of the copolymer latex is toluene-insoluble.

Therefore, an electrode-coating layer that is excellent in binding capacity to the current collector and to the active material; low in tackiness and excellent in workability; excellent in resistance to bending and cracks; and excellent in flexibility can be formed.

DESCRIPTION OF EMBODIMENTS

The binder for secondary battery electrodes of the present invention contains a copolymer latex obtained by emulsion polymerization of a monomer composition containing an aliphatic conjugated diene-based monomer, an unsaturated carboxylic acid alkyl ester monomer, an ethylene-based unsaturated carboxylic acid monomer, and a monomer that is copolymerizable therewith.

Examples of the aliphatic conjugated diene-based monomer include 1,3-butadiene, 2-methyl-1,3-butadiene, 2,3-dimethyl-1,3butadiene, 2-chloro-1,3-butadiene, substituted linear conjugated pentadienes, and substituted and side chain conjugated hexadienes; and one, or two or more of these may be used. A preferable example is 1,3-butadiene.

Examples of the unsaturated carboxylic acid alkyl ester include acrylic acid alkyl ester having an alkyl group with 1 to 8 carbon atoms, such as methylacrylate, ethylacrylate, butylacrylate, and 2-ethyihexylacrylate; methacrylic acid alkyl ester having an alkyl group with 1 to 4 carbon atoms such as methyl methacrylate and ethyl methacrylate; maleic acid alkyl ester having an alkyl group with 1 to 4 carbon atoms such as dimethyl maleate and diethyl maleate; itaconic acid alkyl ester having an alkyl group with 1 to 4 carbon atoms such as dimethyl itaconate; and fumaric acid alkyl ester having an alkyl group with 1 to 4 carbon atoms such as monomethyl fumarate, monoethyl fumarate, dimethyl fumarate, and diethyl fumarate. These may be used singly or in combination of two or more. Preferable example is a methacrylic acid alkyl ester having an alkyl group with 1 to 4 carbon atoms, and more preferable example is methyl methacrylate.

Examples of the ethylene-based unsaturated carboxylic acid monomer include mono or dicarboxylic acid (anhydride) such as acrylic acid, methacrylic acid, crotonic acid, maleic acid, fumaric acid, and itaconic acid. One, or two or more of these may be used. Preferable examples are acrylic acid, fumaric acid, and itaconic acid.

Examples of the monomer that is copolymerizable therewith (above-described aliphatic conjugated diene-based monomer, unsaturated carboxylic acid alkyl ester monomer, and ethylene-based unsaturated carboxylic acid monomer) include an alkenyl aromatic monomer, a vinyl cyanide monomer, a hydroxyalkyl group-containing unsaturated monomer, and an unsaturated carboxylic acid amide monomer. One, or two or more of these may be used.

Examples of the alkenyl aromatic monomer include styrene, α-methylstyrene, methylα-methylstyrene, vinyl toluene, and divinylbenzene. One, or two or more of these may be used. A preferable example is styrene.

Examples of the vinyl cyanide monomer include acrylonitrile, methacrylonitrile, α-chloroacrylonitrile, and α-ethylacrylonitrile. One, or two or more of these may be used. Preferable examples are acrylonitrile, and methacrylonitrile.

Examples of the hydroxyalkyl group-containing unsaturated monomer include 2-hydroxyethylacrylate, 2-hydroxyethyl methacrylate, hydroxypropylacrylate, hydroxypropyl methacrylate, hydroxybutylacrylate, hydroxybutyl methacrylate, 3-chloro-2-hydroxypropyl methacrylate, di-(ethylene glycol) maleate, di-(ethylene glycol) itaconate, 2-hydroxyethyl maleate, bis(2-hydroxyethyl) maleate, and 2-hydroxyethylmethyl fumarate. One, or two or more of these may be used. A preferable example is 2-hydroxyethylacrylate.

Examples of the unsaturated carboxylic acid amide monomer include acrylamide, methacrylamide, N-methylolacrylamide, N-methylol methacrylamide, and N,N-dimethylacrylamide. One, or two or more of these may be used. Preferable examples are acrylamide and methacrylamide.

Furthermore, other than the above-described monomers, those monomers capable of radical polymerization such as ethylene, propylene, vinyl acetate, vinyl propionate, vinyl chloride, and vinylidene chloride may also be used.

The monomer composition contains 12.0 to 39.5 wt %, or preferably 17 to 39 wt % of the aliphatic conjugated diene-based monomer; 1.5 to 8.5 wt %, or preferably 2 to 8 wt % of the unsaturated carboxylic acid alkyl ester monomer; 0.1 to 10.0 wt %, or preferably 0.5 to 5 wt % of the ethylene-based unsaturated carboxylic acid monomer; and as a remaining component, for example, 42.0 to 86.4 wt %, or preferably 48 to 80.5 wt % of the monomer that is copolymerizable therewith.

When the aliphatic conjugated diene-based monomer content is below 12.0 wt %, the binding capacity to the current collector decreases, and therefore the binding capacity of the electrode-coating layer decreases; and when the aliphatic conjugated diene-based monomer content exceeds 39.5 wt %, tackiness of the electrode-coating layer increases, which will lead to a decrease in workability.

When the unsaturated carboxylic acid alkyl ester monomer content is below 1.5 wt %, the flexibility of the electrode-coating layer decreases; and when the unsaturated carboxylic acid alkyl ester monomer content exceeds 8.5 wt %, the resistance to bending and cracks of the electrode-coating layer decreases.

When the ethylene-based unsaturated carboxylic acid monomer content is below 0.1 wt %, stability of the electrode composition and binding capacity of the electrode-coating layer decrease; and when the ethylene-based unsaturated carboxylic acid monomer content exceeds 10.0 wt %, viscosity of the copolymer latex increases, and handling properties of the copolymer latex decreases.

When the monomer content is out of the range of 42.0 to 86.4 wt %, achieving compatibility of binding capacity and tackiness in the electrode-coating layer becomes difficult.

Then, by carrying out emulsion polymerization of the monomer composition in water, a copolymer latex is obtained.

To carry out emulsion polymerization of the monomer composition, an emulsifier and a polymerization initiator are added to the monomer composition.

Examples of the emulsifier include anionic surfactants such as a sulfuric acid ester salt of higher alcohols, alkylbenzene sulfonate, alkyldiphenylether disulfonate, aliphatic sulfonate, aliphatic carboxylate, and a sulfuric acid ester salt of nonionic surfactants; and nonionic surfactants of a polyethylene glycol alkyl ester type, an alkyl phenyl ether type, and an alkyl ether type. One, or two or more of these are used. A preferable example is an anionic surfactant, and more preferable examples are alkylbenzenesulfonate and alkyldiphenylether sulfonate.

The emulsifier is blended, for example, at a ratio of 0.05 to 5 parts by weight, or preferably 0.1 to 3 parts by weight relative to 100 parts by weight of the monomer composition.

The polymerization initiator is a radical polymerization initiator, including, for example, a water-soluble polymerization initiator such as potassium persulfate, sodium persulfate, and ammonium persulfate; and an oil-soluble polymerization initiator such as cumene hydroperoxide, benzoyl peroxide, t-butyl hydroperoxide, acetyl peroxide, diisopropylbenzene hydroperoxide, and 1,1,3,3-tetramethylbutyl hydroperoxide. Preferable examples are, as the water-soluble polymerization initiator, potassium persulfate, sodium persulfate, and ammonium persulfate, and as the oil-soluble polymerization initiator, cumene hydroperoxide.

To carry out emulsion polymerization of the monomer composition, a reductant and a chain transfer agent may be added as necessary.

Examples of the reductant include ferrous sulfate; sulfite; bisulfite; pyrosulfite; dithionite; dithionate; thiosulfate; formaldehyde sulfonate; benzaldehyde sulfonate; carboxylic acids such as L-ascorbic acid, erythorbic acid, tartaric acid, citric acid, and salts thereof; reducing sugars such as dextrose and saccharose; and amines such as dimethylaniline and triethanol amine. Preferable examples are ferrous sulfate, carboxylic acids, and salts thereof, more preferable examples are ferrous sulfate and erythorbic acid.

Examples of the chain transfer agent include an alkyl mercaptan having an alkyl group with 6 to 18 carbon atoms such as n-hexyl mercaptan, n-octyl mercaptan, t-octyl mercaptan, n-dodecyl mercaptan, t-dodecyl mercaptan, and n-stearyl mercaptan; xanthogen compounds such as dimethyl xanthogen disulfide and diisopropyl xanthogen disulfide; terpinolene; thiuram compounds such as tetramethyl thiuram disulfide, tetraethyl thiuram disulfide, and tetramethyl thiuram monosulfide; phenol compounds such as 2,6-di-t-butyl-4-methylphenol and styrenated phenol; an allyl compound such as allyl alcohol; halogenated hydrocarbon compounds such as dichloromethane, dibromomethane, and carbon tetrabromide; vinylethers such as α-benzyloxystyrene, α-benzyloxyacrylonitrile, and α-benzyloxyacrylamide; triphenylethane; pentaphenylethane; acrolein; methacrolein; thioglycolic acid; thiomalic acid; 2-ethylhexylthioglycolate; and α-methylstyrene dimer. One, or two or more of these may be used. Preferable examples are α-methylstyrene dimer, and alkylmercaptan, and more preferable examples are α-methylstyrene dimer and t-dodecylmercaptan.

The chain transfer agent is added, for example, at a ratio of 0 to 5 parts by weight, or preferably 0.05 to 3 parts by weight relative to 100 parts by weight of the monomer composition.

In the emulsion polymerization, an unsaturated hydrocarbon may be added as necessary. Examples of the unsaturated hydrocarbon include pentene, hexene, heptene, cyclopentene, cyclohexene, cycloheptene, 4-methylcyclohexene, and 1-methylcyclohexene; and a preferable example is cyclohexene. Cyclohexene is preferable in view of environmental burden, because it has a low boiling point and easily recovered and recycled by steam distillation and the like after polymerization.

As other additives, for example, an age resister, a preservative, a dispersing agent, and a thickener may be added as necessary.

The polymerization method is not particularly limited, and methods of batch polymerization, semi-batch polymerization, and seed polymerization may be used. The method of adding the various components also is not particularly limited, and methods such as a collective addition method, a divisional addition method, a continuous addition method, and a power feed method may be used.

The emulsion polymerization of the monomer composition is carried out in such a manner, and a copolymer latex in which the obtained copolymer is dispersed in water can be obtained.

The solid content of the obtained copolymer latex is, for example, 40 to 55 wt %, or preferably 47 to 52 wt %.

The copolymer in the obtained copolymer latex has a glass transition temperature (Tg) of, for example, −20 to 90° C., or preferably −15 to 70° C.

50 to 100 wt %, or preferably 60 to 99 wt % of the obtained copolymer latex is toluene-insoluble (gel content). When the gel content is below 50 wt %, the binding capacity of the electrode-coating layer tends to decrease, and tackiness of the electrode-coating layer tends to increase, which leads to a decrease in workability.

The number average particle size of the copolymer in the obtained copolymer latex is not particularly limited, and is, for example, 50 to 300 nm, or preferably 70 to 250 nm.

The binder for secondary battery electrodes of the present invention is used for forming, for example, an electrode of secondary batteries such as lithium ion secondary batteries, nickel-metal hydride batteries, and nickel cadmium batteries; and binds particles of a negative electrode component material or a positive electrode active material, and binds the negative electrode component material or positive electrode active material to the current collector.

To be specific, the battery electrode composition is prepared by blending the binder for secondary battery electrodes with the negative electrode component material or positive electrode active material. That is, by blending the binder for secondary battery electrodes with the negative electrode component material, a negative electrode composition used for a negative electrode of secondary batteries is prepared. Furthermore, by blending the binder for secondary battery electrodes with the positive electrode active material, a positive electrode composition used for a positive electrode of secondary batteries is prepared.

Examples of the negative electrode component material include, but not limited to, in the case of non-aqueous electrolyte secondary batteries, conductive carbon materials such as fluorocarbon, graphite, carbon fiber, resin baked carbon, linear•graphite•hybrid, coke, pyrolysis vapor grown carbon, furfuryl alcohol resin baked carbon, mesocarbon microbeads, mesophasepitch-based carbon, graphite whisker, quasi-isotropic carbon, a baked product of natural materials, and a ground product of these; and conductive polymers such as polyacene-based organic semiconductor, polyacetylene, and poly-p-phenylene. One, or two or more of these may be used.

Examples of the positive electrode active material include, but not limited to, transition metal oxides such as $MnO_2$, $MoO_3$, $V_2O_5$, $V_6O_{13}$, $Fe_2O_3$, and $Fe_3O_4$; composite oxides containing lithium such as $LiCoO_2$, $LiMnO_2$, $LiNiO_2$, and $Li_xCo_ySn_zO_2$; a composite metal oxide containing lithium such as $LiFePO_4$; transition metal sulfides such as $TiS_2$, $TiS_3$, $MoS_3$, and $FeS_2$; and metal fluorides such as $CuF_2$ and $NiF_2$. One, or two or more of these may be used.

When preparing a battery electrode composition, a binder for secondary battery electrodes is blended so that the solid content of the copolymer latex is, for example, 0.1 to 7 parts by weight, or preferably 0.5 to 4 parts by weight relative to 100 parts by weight of the negative electrode component material or positive electrode active material.

When the solid content of the copolymer latex is below 0.1 parts by weight relative to 100 parts by weight of the negative electrode component material or positive electrode active material, there is a tendency to fail in obtaining excellent adhesion to the current collector and the like, and when the solid content of the copolymer latex exceeds 7 parts by weight relative to 100 parts by weight of the negative electrode component material or positive electrode active material, the overvoltage tends to increase significantly when assembled as a secondary battery, leading to a decrease in battery performance.

Various additives such as a water-soluble thickener, a dispersing agent, and a stabilizing agent may be added to the battery electrode composition as necessary. Examples of the water-soluble thickener include carboxymethyl cellulose, methyl cellulose, hydroxymethyl cellulose, ethyl cellulose, polyvinyl alcohol, polyacrylic acid (polyacrylate), oxidized starch, phosphorylated starch, and casein; examples of the dispersing agent include sodium hexametaphosphate, sodium tripolyphosphate, sodium pyrophosphate, and sodium polyacrylate; and examples of the stabilizing agent include nonionic and anionic surfactants.

When a water-soluble thickener is to be added to the battery electrode composition, for example, the water-soluble thickener is blended at a ratio of, for example, 0.1 to 10 parts by weight, or preferably 0.5 to 5 parts by weight by solid content relative to 100 parts by weight of the negative electrode component material or positive electrode active material.

The battery electrode composition is applied on the current collector and dried to form an electrode-coating layer on the current collector, thereby obtaining an electrode sheet. Such an electrode sheet is used as a positive electrode plate or negative electrode plate of lithium ion secondary batteries.

Examples of the current collector include, for negative electrode current collectors, metal foil of, for example, copper or nickel, and for positive electrode current collectors, metal foil of, for example, aluminum.

As the method for applying the battery electrode composition on the current collector, known methods such as a reverse roll method, a comma bar method, a gravure method, or an air knife method may be used, and for drying, natural drying, a blower drying machine, a hot air drying machine, an infrared heater, or a far-infrared radiation heater is used. The drying temperature is usually 50° C. or more.

With the binder for secondary battery electrodes according to the present invention, an electrode-coating layer that is excellent in binding capacity to the current collector and the active material; low in tackiness and excellent in workability; and excellent in resistance to bending and cracks, and flexibility can be formed.

EXAMPLES

While in the following, the present invention is described in further detail with reference to Examples, the present invention is not limited to any of them by no means. In Examples, parts and % indicating the mixing ratio is based on weight.

1. Synthesis of Copolymer Latex (1) Synthesis Example 1

A pressure-resistant polymerization reactor was charged with 120 parts of pure water, 1 part of sodium dodecylbenzenesulfonate, and 1 part of potassium persulfate, and the mixture was stirred sufficiently.

Then, monomers and t-dodecylmercaptan as indicated under the first stage of the monomer introduction stage shown in Table 1, and 8 parts of cyclohexene were introduced into the polymerization reactor.

Separately, monomers indicated under the second stage of the monomer introduction stage shown in Table 1 were mixed, thereby preparing a monomer mixture.

Then, the internal temperature of the polymerization reactor was increased to 70° C. while stirring, and heat generation due to initiation of polymerization was confirmed.

Thereafter, up to 480 minutes from the initiation of polymerization, while keeping the internal temperature to 70° C., a mixture of the monomer mixture, 10 parts of pure water, and 0.3 parts of alkyl diphenyl ether disulfonate were continuously added. From 480 minutes to 780 minutes, the internal temperature was kept to 75° C. and the polymerization was continued.

Then, after 780 minutes from the initiation of polymerization, confirming that the polymerization conversion rate exceeded 97%, the internal temperature was cooled to 35° C. or less.

After adjusting the pH to about 8 using an aqueous solution of potassium hydroxide, unreacted monomers and the like were removed by steam distillation, thereby obtaining copolymer latex (a).

(2) Synthesis Example 2

A pressure-resistant polymerization reactor was charged with 90 parts of pure water, 0.5 parts of sodium dodecylbenzenesulfonate, and 1 part of potassium persulfate, and the mixture was stirred sufficiently.

Then, monomers as indicated under the first stage of the monomer introduction stage shown in Table 1, and 4 parts of cyclohexene were introduced into the polymerization reactor.

Separately, monomers and t-dodecylmercaptan indicated under the second stage of the monomer introduction stage shown in Table 1 were mixed, thereby preparing a monomer mixture.

Then, the internal temperature of the polymerization reactor was increased to 65° C. while stirring, and heat generation due to initiation of polymerization was confirmed.

Thereafter, up to 480 minutes from the initiation of polymerization, while keeping the internal temperature to 70° C., a mixture of the monomer mixture, 10 parts of pure water, and 1.0 part of fumaric acid were continuously added. From 480 minutes to 540 minutes, monomers and t-dodecylmercaptan indicated under the third stage of the monomer introduction stage shown in Table 1 were continuously added. From 540 minutes to 780 minutes, the polymerization was continued while keeping the internal temperature to 70° C.

Then, after 780 minutes from the initiation of polymerization, confirming that the polymerization conversion rate exceeded 97%, a polymerization terminator was added, and the internal temperature was cooled to 35° C. or less.

After adjusting the pH to about 7 using an aqueous solution of lithium hydroxide, unreacted monomers and the like were removed by steam distillation, thereby obtaining copolymer latex (b).

(3) Synthesis Example 3

A pressure-resistant polymerization reactor was charged with 110 parts of pure water, 0.15 parts of sodium dodecylbenzenesulfonate, and 0.45 parts of potassium persulfate, and the mixture was stirred sufficiently.

Then, 2 parts of cyclohexene and 0.1 parts of α-methylstyrene dimer were introduced into the polymerization reactor.

Separately, monomers and t-dodecylmercaptan as indicated under the first stage of the monomer introduction stage shown in Table 1 were mixed, thereby preparing a monomer mixture.

Then, the internal temperature of the polymerization reactor was increased to 60° C. while stirring, and heat generation due to initiation of polymerization was confirmed.

Thereafter, up to 540 minutes from the initiation of polymerization, while keeping the internal temperature to 60° C., a mixture of the monomer mixture, 10 parts of pure water, and 0.1 parts of sodium dodecylbenzenesulfonate were continuously added. From 540 minutes to 720 minutes, the polymerization was continued while keeping the internal temperature to 80° C.

Then, after 720 minutes of the initiation of polymerization, confirming that the polymerization conversion rate exceeded 97%, a polymerization terminator was added, and the internal temperature was cooled to 35° C. or less.

After adjusting the pH to about 6 using an aqueous solution of sodium hydroxide, unreacted monomers and the like were removed by steam distillation, thereby obtaining copolymer latex (c).

(4) Synthesis Example 4

A pressure-resistant polymerization reactor was charged with 130 parts of pure water, 0.4 parts of sodium alkyl diphenyl ether disulfonate, 1 part of polyoxyethylene lauryl ether (Emulgen 109P, manufactured by Kao Corporation), 0.001 parts of ferrous sulfate, 0.08 parts of erythorbic acid, and 0.01 parts of tetrasodium ethylenediaminetetraacetate, and the mixture was stirred sufficiently.

Then, monomers and t-dodecylmercaptan as indicated under the first stage of the monomer introduction stage shown in Table 1 were introduced into the polymerization reactor.

Separately, monomers and t-dodecylmercaptan indicated under the second stage of the monomer introduction stage shown in Table 1 were mixed, thereby preparing a monomer mixture.

Then, 0.06 parts of cumene hydroperoxide was added thereto, and the internal temperature was increased to 35° C., and heat generation due to initiation of polymerization was confirmed.

Thereafter, the internal temperature was kept to 35° C. up to 300 minutes from the initiation of polymerization, and then from 300 minutes to 360 minutes, the internal temperature was increased to 60° C. From 360 minutes to 600 minutes, while keeping the internal temperature to 60° C., a mixture of the monomer mixture, 15 parts of pure water, 0.4 parts of sodium alkyl diphenyl ether disulfonate, and 0.3 parts of potassium persulfate was continuously added. The internal temperature was kept to 60° C. from 600 minutes to 750 minutes, and then the internal temperature was increased to 70° C., and from 750 minutes to 990 minutes, the polymerization was continued while keeping the internal temperature to 70° C.

Then, after 990 minutes of the initiation of polymerization, confirming that the polymerization conversion rate exceeded 97%, a polymerization terminator was added, and the internal temperature was cooled to 35° C. or less.

After adjusting the pH to about 7.5 using ammonia water, unreacted monomers and the like were removed by steam distillation, thereby obtaining copolymer latex (d).

(5) Synthesis Example 5

Copolymer latex (e) was obtained in the same manner as in (Synthesis Example 4), except that the kinds and amounts of the monomers were changed according to Table 1.

(6) COMPARATIVE SYNTHESIS EXAMPLES

Comparative Synthesis Example 1

Copolymer latex (f) was obtained in the same manner as in (Synthesis Example 4), except that the kinds and amounts of the monomers were changed according to Table 2.

Comparative Synthesis Example 2

Copolymer latex (g) was obtained in the same manner as in (Synthesis Example 3), except that the kinds and amounts of the monomers were changed according to Table 2.

Comparative Synthesis Example 3

Copolymer latex (h) was obtained in the same manner as in (Synthesis Example 1), except that the kinds and amounts of the monomers were changed according to Table 2.

Comparative Synthesis Example 4

Copolymer latex (i) was obtained in the same manner as in (Synthesis Example 2), except that the kinds and amounts of the monomers were changed according to Table 2.

Comparative Synthesis Example 5

Copolymer latex (j) was obtained in the same manner as in (Synthesis Example 3), except that the kinds and amounts of the monomers were changed according to Table 2.

Comparative Synthesis Example 6

Copolymer latex (k) was obtained in the same manner as in (Synthesis Example 4), except that the kinds and amounts of the monomers were changed according to Table 2.

2. Measurements of Toluene-Insoluble (Gel Content) in Copolymer Latex

Latex films were made using the copolymer latexes obtained in Synthesis Examples and Comparative Synthesis Examples under an atmosphere at a temperature of 40° C. and a humidity of 85%. About 1 g of the weighted latex film thus made was introduced into 400 ml of toluene, and allowed to be swelled and dissolved for 48 hours. Afterwards, the swelled and dissolved latex film in toluene was filtered through a 300 mesh wire-net, and the toluene-insoluble captured in the wire-net was dried and then weighed. Then, a percentage of the weight of the dried toluene-insoluble relative to the weight of the latex film was calculated. The results are shown in Tables 1 and 2.

3. Production of Electrode Sheet (1) Production of Electrode Composition

An electrode composition of Examples and Comparative Examples was prepared by using natural graphite having an average particle size of 20 μm as the conductive carbon material; and kneading, 2 parts by weight of an aqueous solution containing carboxymethyl cellulose by a solid content as a thickener, 3 parts by weight of a copolymer latex obtained in Synthesis Examples and Comparative Synthesis Examples relative to 100 parts by weight of the natural graphite; and adding an appropriate amount of water so that the solid content of the electrode composition is 40%.

(2) Production of Electrode Sheet

The electrode composition of Examples and Comparative Examples was applied on both sides of a copper foil having a thickness of 20 μm as a current collector; dried at 120° C. for 20 minutes; and pressed under ambient temperature, thereby obtaining an electrode sheet having a coating layer with a thickness of 80 μm (per one side).

4. Electrode Sheet Performance Test (1) Measurement of Binding Capacity of Electrode-Coating Layer Six slits were made on the surface of the electrode sheet of Examples and Comparative Examples using a knife so that the depth of the slit reaches the current collector from the coating layer, at an interval of 2 mm vertically and horizontally, forming a grid of 25 blocks (5×5). An adhesive tape was adhered to this grid and stripped off immediately, and the degree of graphite separation was visually evaluated. The results are shown in Tables 3 and 4.

Excellent: no delamination.
Good: delamination of 1 to 3 blocks.
Poor: delamination of 4 to 10 blocks.
Bad: delamination of 11 or more blocks.

(2) Measurement of Tackiness of Electrode-Coating Layer

Two electrode sheets of Examples and Comparative Examples were laminated, and pressed with a desktop pressing machine at 50° C. and 50 Kg for 5 minutes and stripped off by hand, and evaluated based on the criteria below. The results are shown in Tables 3 and 4.

Excellent: easily stripped off.
Good: stripped off smoothly with slight resistance.
Poor: strong resistance, with sounds when being stripped off.
Bad: adhered and difficult to be stripped off.

(3) Measurement on Resistance to Bending and Cracks of Electrode-Coating Layer

The electrode sheets of Examples and Comparative Examples were cut out to a rectangle of 10 cm×5 cm, and the rectangle was fold in the middle to 180°, thereby making a test piece of a 5 cm square. The test piece was pressed with a heat sealer, at a pressure of 0.05 MPa for 2 seconds. The test piece that was taken out was observed with an optical microscope internally and externally at its crease. The test piece was evaluated as follows based on the observation. The results are shown in Tables 3 and 4.

Excellent: no bending and cracks.
Good: slight bending and cracks observed on electrode sheet surface, but no exposure of current collector observed.
Poor: bending and cracks at electrode sheet surface observed, and slight exposure of current collector observed.
Bad: bending and cracks on electrode sheet surface observed, and exposure of current collector observed at many bent and cracked spots.

(4) Measurement on Electrode-Coating Layer Flexibility

The electrode sheets of Examples and Comparative Examples were cut out into a rectangle of 8 cm×2 cm, and the bending resistance of the electrode sheet was measured using a Handle-O-Meter manufactured by TOYO SEIKI Co., Ltd., with a slit width of 5 mm. The results are shown in Tables 3 and 4.

Excellent: resistance of below 60 g.
Good: resistance of 60 g or more and below 75 g.
Poor: resistance of 75 g or more and below 90 g.
Bad: resistance of 90 g or more.

TABLE 1

| | | Synthesis Example | | | | | | | | |
|---|---|---|---|---|---|---|---|---|---|---|
| | | 1 | | 2 | | | 3 | 4 | | 5 |
| | | Copolymer Latex | | | | | | | | |
| | | a | | b | | | c | d | | e |
| Monomer Introduction Stage | | 1st | 2nd | 1st | 2nd | 3rd | 1st | 1st | 2nd | 1st | 2nd |
| Monomer (Parts by Weight) | 1,3-butadiene | 2.5 | 19.5 | 2.5 | 25 | | 33 | 16 | 23 | 16 | 23 |
| | Methyl Methacrylate | 1.5 | | 2 | 6 | | 3 | 2 | | 2 | |
| | Styrene | 5 | 67.5 | 2.5 | 39 | 5 | 59.5 | 16 | 20 | 16 | 20 |
| | Acrylonitrile | | | 1.5 | 7.5 | 5 | | 8 | 12 | 8 | 12 |
| | Methacrylamide | | | | | | 1 | | 1 | | 1 |
| | Hydroxyethylacrylate | 1 | | 1 | | | 1 | | | | |
| | Itaconic Acid | | | | | | 2 | 1 | | 1 | |
| | Acrylic Acid | 2 | | 1 | | | 0.5 | 1 | | 1 | |
| | Fumaric Acid | 1 | | 1 | 1 | | | | | | |
| t-dodecylmercaptan (Parts by Weight) | | 0.1 | | 0.2 | | 0.1 | 0.5 | 0.15 | 0.15 | 0.3 | 0.45 |
| Gel Content (wt %) | | 95 | | 88 | | | 80 | 90 | | 55 | |

TABLE 2

| | | Comparative Synthesis Example | | | | | | | | | |
|---|---|---|---|---|---|---|---|---|---|---|---|
| | | 1 | | 2 | 3 | | 4 | | | 5 | 6 |
| | | Copolymer Latex | | | | | | | | | |
| | | f | | g | h | | i | | | j | k |
| Monomer Introduction Stage | | 1 | 2 | 1 | 1 | 2 | 1 | 2 | 3 | 1 | 1 | 2 |
| Monomer (Parts by Weight) | 1,3-butadiene | 18 | 7.5 | 60 | 5 | 20 | 3 | 22 | 5 | 28 | 16 | 23 |
| | Methyl Methacrylate | 15 | 8 | 5 | | | 6 | 4 | | 1 | 2 | |
| | Styrene | 16.5 | 32 | 32 | 15 | 58.5 | 6 | 38 | 10 | 57.5 | 16 | 20 |
| | Acrylonitrile | | | | | | | | | 10 | 8 | 12 |
| | Methacrylamide | | 1 | 1 | | | | | | | | 1 |
| | Hydroxyethylacrylate | | | | | | | | | 1 | | |
| | Itaconic Acid | 0.5 | 0.5 | 2 | 1.5 | | 1 | | | 2.5 | 1 | |
| | Acrylic Acid | 1 | | | | | 3 | | | | 1 | |
| | Fumaric Acid | | | | | | 1 | 1 | | | | |
| t-dodecylmercaptan (Parts by Weight) | | 0.1 | 0.15 | 0.2 | 0.02 | 0.08 | | 0.1 | 0.15 | 0.6 | 0.5 | 1 |
| Gel Content (wt %) | | 88 | | 96 | 86 | | 82 | | | 85 | 40 | |

TABLE 3

| | Examples | | | | |
|---|---|---|---|---|---|
| | 1 | 2 | 3 | 4 | 5 |
| Copolymer Latex | a | b | c | d | e |
| Binding Capacity of Electrode-Coating Layer | Good~Excellent | Good | Good~Excellent | Good~Excellent | Good |
| Tackiness of Electrode-Coating Layer | Excellent | Excellent | Good | Good~Excellent | Good |
| Resistance To Bending And Cracks of Electrode-Coating Layer | Good | Good | Excellent | Good | Good~Excellent |
| Flexibility of Electrode-Coating Layer | Good | Good~Excellent | Excellent | Good | Excellent |

TABLE 4

| | Comparative Examples | | | | | |
|---|---|---|---|---|---|---|
| | 1 | 2 | 3 | 4 | 5 | 6 |
| Copolymer Latex | f | g | h | i | j | k |
| Binding Capacity of Electrode-Coating Layer | Good | Excellent | Good | Good | Good | Bad |
| Tackiness of Electrode-coating layer | Good | Bad | Good | Good | Good | Poor |
| Resistance to Bending and Cracks of Electrode-coating layer | Bad | Good | Good | Poor~bad | Poor | Excellent |
| Flexibility of Electrode-Coating Layer | Good~poor | Good | Bad | Poor | Poor~bad | Excellent |

While the above description has been given as the illustrative embodiments of the present invention, such is for illustrative purpose only and it is not to be construed as limiting the scope of the present invention. Modification and variation of the present invention which will be obvious to those skilled in the art is to be covered by the following claims.

Industrial Applicability

A binder for secondary battery electrodes of the present invention is used as a binder for secondary battery electrodes for binding the active material (positive electrode active material and negative electrode component material) to the current collector in electrodes of secondary batteries.

The invention claimed is:

1. A binder for secondary battery electrodes comprising a copolymer latex obtained by emulsion polymerization of a monomer composition comprising:

12.0 to 39.5 wt % of an aliphatic conjugated diene-based monomer,
1.5 to 8.5 wt % of an unsaturated carboxylic acid alkyl ester monomer,
0.1 to 10.0 wt % of an ethylene-based unsaturated carboxylic acid monomer, and
42.0 to 86.4 wt % of a monomer that is copolymerizable therewith,
wherein the ethylene-based unsaturated carboxylic acid monomer contains dicarboxylic acid in amounts of 1 2% by weight based on total amount of the monomers, and
wherein 80 to 99 wt % of the copolymer latex is toluene-insoluble and,
wherein the copolymer latex further comprises water as a dispersion medium.

* * * * *

UNITED STATES PATENT AND TRADEMARK OFFICE
CERTIFICATE OF CORRECTION

PATENT NO. : 9,090,728 B2
APPLICATION NO. : 13/517365
DATED : July 28, 2015
INVENTOR(S) : Takashi Matsuyama et al.

Page 1 of 1

It is certified that error appears in the above-identified patent and that said Letters Patent is hereby corrected as shown below:

In the claims,

Column 14, Claim 1, Lines 33-34: change "1.5 to 8.5 wt% of an unsaturated carboxylic acid alkyl ester monomer" to --1.5 to 3 wt% of an unsaturated carboxylic acid alkyl ester monomer,--

Column 14, Claim 1, Lines 39-41: change "wherein the ethylene-based unsaturated carboxylic acid monomer contains dicarboxylic acid in amounts of 1 2% by weight based on total amount of the monomers, and" to --wherein the ethylene-based unsaturated carboxylic acid monomer contains dicarboxylic acid in amounts of 1 to 2% by weight based on total amount of the monomers, and--

Signed and Sealed this
Ninth Day of February, 2016

Michelle K. Lee
*Director of the United States Patent and Trademark Office*